Patented Jan. 8, 1946

2,392,505

UNITED STATES PATENT OFFICE 2,392,505

MONOCHLOROHYDANTOINS AND SALTS THEREOF

Arthur O. Rogers, Lewiston, N. Y., assignor to E. I. du Pont de Nemours & Company, Wilmington, Del., a corporation of Delaware No Drawing. Application June 6, 1944, Serial No. 539,027

9 Claims. (Cl. 260—309.5)

This invention relates to the preparation of chlorinated hydantoins and metal salts thereof.

N-monochlorohydantoins having organic radicals substituted for the hydrogen atoms in the 5,5-position may be prepared according to the process described and claimed in the copending applications by Paul LaFrone Magill—Serial No. 486,092 filed May 7, 1943; and Serial No. 538,879. In accordance with the process of the above Magill applications, a 5,5-disubstituted hydantoin is reacted with the corresponding 1,3-dichloro-5,5-disubstituted hydantoin. The monochlorohydantoin thus produced has the following formula:

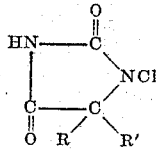

wherein R and R' represent organic radicals. The simplest member of the series is N-monochloro-5,5-dimethyl hydantoin.

In carrying out the above method, a disubstituted hydantoin may be made by known methods from any desired ketone or organic compound having the keto group

including cyclic ketones such as cyclohexanone and ketones typified by the formula RR'CO, where R and R' may be the same or different aliphatic and aromatic organic radicals. Such disubstituted hydantoins, when reacted with a halogen such as chlorine in an aqueous medium, very rapidly take up halogen to form the 1,3-dihalohydantoin. For example, by this method 1,3-dichloro-5,5-dimethyl hydantoin is readily prepared. The dichlorohydantoin is only slightly soluble in water and may be recovered as a precipitate from the aqueous medium. The dichloro compound thus produced may be reacted with the unchlorinated hydantoin as above described to produce the N-monochlorohydantoin.

An object of the present invention is to provide a new method for the preparation of N-monochloro disubstituted hydantoins. A further object is the preparation of metal salts of N-monochloro disubstituted hydantoins. The invention also includes said metal salts as novel and useful compositions of matter. Still other objects will be apparent from the following description of the invention.

In accordance with the present invention, it has been discovered that by controlling the conditions of halogenation it is possible to directly produce an N-monohalo disubstituted hydantoin by reacting the corresponding disubstituted hydantoin with halogen. While the new method is generally applicable to halogenation with chlorine, bromine, iodine, or fluorine, it is described hereinafter by reference to chlorination.

In accordance with the present invention, a disubstituted hydantoin is reacted with chlorine or other halogen in an aqueous medium while maintaining the reaction mixture in an alkaline condition and stopping the reaction when the theoretical amount of the halogen required to form the monochlorohydantoin has reacted. For example, in one method of practicing my invention I mix the disubstituted hydantoin with water containing an alkalizing agent such as sodium hydroxide, sodium carbonate, sodium bicarbonate, borax, trisodium phosphate, or the like and then pass gaseous chlorine into the mixture in the calculated amount required to form the monochloride of the hydantoin (i. e. one mole of chlorine ($Cl_2$) per mole of hydantoin). As the reaction causes the formation of hydrochloric acid, part of the alkali becomes neutralized. It is essential that the reaction mixture be kept in an alkaline condition until at least a major portion of the hydantoin has been converted to the monochlorohydantoin. Accordingly, the reaction mixture must contain sufficient of the alkaline agent to maintain such alkalinity. If desired, a small amount of alkali may be present initially, and further amounts may be added during the course of the reaction.

In a preferred modification the aqueous reaction medium contains approximately the required amount of alkali to maintain the mixture alkaline throughout the course of the reaction, and the introduction of chlorine is then stopped when the reaction mixture, which should be kept well stirred, first begins to show an acidic reaction. For example, I may mix one mole of a disubstituted hydantoin with an aqueous solution containing one mole of sodium bicarbonate and pass chlorine into the mixture with continuous stirring until the reaction mixture becomes just neutral or slightly acidic.

While the desired reaction may be carried out at elevated temperatures, it has been found that best results are obtained at room temperature or at only slightly elevated temperatures, especially within the range of about 20 to 50° C. The optimum temperature may vary, depending upon the particular hydantoin being chlorinated and can readily be determined by trial.

As the N-monochlorohydantoin is formed, it reacts with the alkali present to form a soluble alkali metal salt. Hence, if the reaction mixture is still alkaline when the reaction mixture is complete, the product will be in solution as an alkali metal salt. The product then may readily be isolated and recovered by sufficiently acidifying the salt to cause precipitation of the N-monochlorohydantoin, which is slightly soluble in water. This product may be filtered off or otherwise separated from the aqueous medium by known methods and dried, preferably at relatively low temperatures. Generally it is preferred to dry the product substantially at room temperature.

When the reaction is carried out as above described so that at the end of the reaction the mixture is neutral or only slightly acidic, the N-monochlorohydantoin as formed first dissolves and at the end of the reaction appears as a precipitate. It may then be recovered as described above.

It has been found that by this method a substantially quantitative yield of N-monochlorohydantoin can be produced, containing little or no dichlorohydantoin.

It has further been discovered that the N-monochlorohydantoins react readily in aqueous media with water-soluble compounds of metals to form the corresponding metal salts. The salts of the alkali metals preferably are made by reacting the monochlorohydantoins with soluble alkali metal compounds having alkaline reaction. The alkali metal salts are highly soluble in water and may be recovered from the aqueous solution by evaporation and crystallization. The alkaline earth metal salts such as the calcium and barium salts are also soluble in water. The salts of other metals, especially those lying below the alkali metals in the electromotive series of the elements generally have very low solubilities and are formed as precipitates.

To form an insoluble metal salt of N-monochlorohydantoin, the chlorohydantoin may be dissolved in water and a soluble compound of the metal or an aqueous solution thereof added to the hydantoin solution. As the monochlorohydantoins are only slightly soluble in water, it is preferred to first prepare a solution of an alkali metal salt of the chlorohydantoin; for example, by dissolving the chlorohydantoin in an aqueous solution of sodium hydroxide, sodium carbonate, or other alkali, and to then add an aqueous solution of the metal compound thereto.

It has been found that substantially all metals react to form salts of the N-monochloro-5,5-disubstituted hydantoins. By way of example the following table lists the metal salts which have been prepared in accordance with the present invention:

| Metal | Hydantoin |
| --- | --- |
| Zinc | N-monochloro-5-methyl-5-isobutyl hydantoin. |
| Nickel | Do. |
| Silver | Do. |
| Aluminum | Do. |
| Lead | Do. |
| Iron | Do. |
| Tin | Do. |
| Copper | Do. |
| Mercury | Do. |
| Cerium | Do. |
| Sodium | Do. |
| Calcium | Do. |
| Magnesium | Do. |
| Cadmium | Do. |
| Titanium | Do. |
| Cobalt | Do. |
| Chromium | Do. |
| Copper | N-monochloro-5-methyl-5-ethyl hydantoin. |
| Lead | Do. |
| Zinc | Do. |
| Do | N-monochloro-5,5-dimethyl hydantoin. |
| Sodium | N-monochloro-5-methyl-5-n-amyl hydantoin. |
| Do | N-monochloro-5-methyl-5-phenyl hydantoin. |
| Zinc | N-monochloro-5,5-pentamethylene spiro hydantoin. |
| Sodium | Do. |

The invention is further illustrated by the following examples:

Example 1

5-methyl-5-n-amyl hydantoin (18.4 g.) was chlorinated in the presence of 12.7 g. $Na_2CO_3$ and 500 cc. water at 35–40° C. The product weighed 6.0 g., and contained 16.7% active chlorine (calculated for $C_9H_{15}O_2N_2Cl$: 16.2%). It dissolved in aqueous sodium carbonate solution, from which it was recovered unchanged by acidification.

Example 2

5,5-dimethyl hydantoin (12.8 g.) was chlorinated in the presence of 8.4 g. sodium bicarbonate and 100 cc. water at 35–40° C. until the solution was faintly acidic. The product, after filtering, washing, and drying, weighed 14 g. Its melting point was 144–145° C., and its active chlorine content 21.6% (calculated for $$C_5H_7N_2O_2Cl: 21.8\%)$$

The product was soluble in aqueous sodium carbonate solution.

Example 3

10.2 g. of N-monochloro-5-methyl-5-isobutyl hydantoin was dissolved in a solution of 5.4 g. of sodium carbonate in 75 cc. of water, and the solution filtered. A solution of 11.3 g. of aluminum sulfate ($Al_2(SO_4)_3 \cdot 18H_2O$) in 50 cc. of water was added to the hydantoin and the mixture stirred about 15 minutes. The resulting precipitate of the aluminum salt of the monochlorohydantoin was filtered off, washed with water, and dried. The product contained 7.4% by weight of active chlorine.

Example 4

102.3 g. of N-monochloro-5-methyl-5-isobutyl hydantoin was dissolved in a solution of 21.5 g. of sodium hydroxide in 200 cc. of water at room temperature. The solution was filtered and then a solution of 71.1 g. of zinc sulfate ($ZnSO_4 \cdot 7H_2O$) in 500 cc. of water was added slowly with stirring. The zinc salt of the monochlorohydantoin precipitated as a finely divided white solid, which was filtered off, washed with water and dried at room temperature. A yield of 99.2% (117.3 g.) was obtained. The product contained 12.95% by weight of active chlorine. It was insoluble in methylene chloride and soluble in methanol, acetone, tetramethylene oxide and in boiling ethylene dichloride.

Example 5

Following the method of Example 1, 8 g. of copper sulfate ($CuSO_4$) dissolved in 40 cc. water was reacted with 17.7 g. of the monochloro methyl isobutyl hydantoin dissolved in a solution of 12.7 g. of sodium carbonate dissolved in 150 cc. of water. The copper salt precipitated as a green powdery solid.

Example 6

The zinc salt of N-monochloro-5-methyl-5-ethyl hydantoin was prepared by the method of Example 1, using the following ingredients:

Grams
N-monochloro-5-methyl-5-ethyl hydantoin_ 17.7
Sodium carbonate (in 200 cc. of water)_____ 12.7
Zinc sulfate ($ZnSO_4 \cdot 7H_2O$) (in 40 cc. of water) _____ 14.4

The dried product (11.7 g.) was a white powdery solid having 10.8% by weight of active chlorine.

Example 7

A nickel salt of N-monochloro-5-methyl-5-isobutyl hydantoin was prepared by the method of Example 1, using the following ingredients:

| | Grams |
|---|---|
| N-monochloro-5-methyl-5-isobutyl hydantoin | 10.29 |
| Sodium carbonate (in 75 cc. of water) | 5.4 |
| Nickel sulfate ($NiSO_4.6H_2O$) (in 150 cc. of water) | 6.6 |

A 94% yield (11.0 g.) of the nickel salt was obtained, which contained 13.4% of active chlorine.

Example 8

306.9 g. of N-monochloro-5-methyl-5-isobutyl hydantoin was dissolved at room temperature in a solution of 63 g. of sodium hydroxide in 525 cc. of water. The solution was cooled to about 5° C. and kept at that temperature until a quantity of crystals of the trihydrate of the sodium salt of the monochlorohydantoin precipitated. These were filtered off and the filtrate was cooled as before to obtain a second crop of crystals, which were also filtered off. The two crops of crystals were combined and dried in air at room temperature. The product was a water-soluble crystalline material, melting at 50–55° C. and having 12.35% by weight of active chlorine. The yield was 280 g., or 66.6%.

The metal salts also can be made by reacting an aqueous solution or suspension of the N-monochlorohydantoin with an oxide or hydroxide of the metal. For example, the zinc salt may thus be made from finely divided zinc oxide or the copper salt from a precipitate of copper hydroxide or from copper oxide.

The herein-described metal salts of the N-monochloro-disubstituted hydantoins are useful as oxidizing agents for germicidal solutions and as ingredients of active chlorine compositions. For these purposes the water-soluble salts such as the sodium salts generally are more useful. Various of the heavy metal salts such as the salts of zinc, silver, iron, nickel, aluminum, and the like are useful as ingredients for compounding natural and artificial rubber.

My invention is not restricted to the above-mentioned N-monochlorohydantoins, as my herein-described process may be carried out with any of the disubstituted hydantoins. The disubstituted hydantoins useful for practicing the herein-described invention may be derived from various ketones, for example, dialkyl ketones, alkyl alkylene ketones, dialkylene ketones, cycloaliphatic ketones (e. g., cyclohexanone and cyclohexenone, alkyl cyclohexyl ketones, and the like), alkyl aryl ketones, diaryl ketones, and various other ketonic compounds such as keto-esters, keto-acids, keto-alcohols, keto-ethers, and the like.

I claim:

1. The process which comprises reacting a water-soluble salt of a metal below the alkali metals in the electromotive series of the elements with an aqueous solution of an alkali metal salt of an N-monochloro-5,5-dialkyl hydantoin and recovering from said solution the resulting insoluble metal salt of said hydantoin.

2. The process which comprises reacting a water-soluble zinc salt with an aqueous solution of N-monochloro-5,5-dialkyl hydantoin and recovering from said solution the resulting zinc salt of said hydantoin.

3. A salt of an N-monochloro-5,5-dialkyl hydantoin and a metal below the alkali metals in the electromotive series of the elements.

4. A metal salt of an N-monochloro-5,5-dialkyl hydantoin substantially insoluble in water.

5. The zinc salt of an N-monochloro-5,5-dialkyl hydantoin.

6. The zinc salt of N-monochloro-5-methyl-5-isobutyl hydantoin.

7. The zinc salt of N-monochloro-5,5-dimethyl hydantoin.

8. The nickel salt of an N-monochloro-5,5-dialkyl hydantoin.

9. The nickel salt of N-monochloro-5-methyl-5-isobutyl hydantoin.

ARTHUR O. ROGERS.